3,123,624
PREPARATION OF 6α,16α-DIALKYL SUBSTANCE S AND ACYLATES THEREOF
Robert P. Graber, Minneapolis, Minn., and Martin B. Meyers, Glasgow, Scotland, assignors to General Mills, Inc., a corporation of Delaware
No Drawing. Filed Sept. 29, 1961, Ser. No. 141,576
20 Claims. (Cl. 260—397.47)

This invention relates to a novel method of preparation of 6α,16α-dialkyl substance S and the acylates thereof, to novel intermediates in the process and in particular to the preparation of 6α,16α-dimethyl substance S and the acetate ester thereof.

The product, 6α,16α-dimethyl substance S, is a very important intermediate in the synthesis of 6α,16α-dimethyl corticoids. The compound itself, 6α,16α-dimethyl substance S (6α,16α-dimethyl-4-pregnene-17α,21-diol-3,20-dione), is described in U.S. Patent 2,940,968. The corresponding 21-acetate is described in the publication Chemistry and Industry, W. P. Schneider and H. C. Murray, September 10, 1960, page 1163. The microbiological conversion of 6α,16α-dimethyl substance S to the corresponding 11β-hydroxylated derivative and thence to other compounds of high biological potency is also described in the two references given above. In general, the resulting products for which the 6α,16α-dimethyl substance S and the acylates thereof are intermediates in the preparation thereof possess high anti-inflammatory activity and are especially useful for the treatment of arthritis and related diseases.

It is an object of this invention to povide a novel method for the preparation of 6,16-dialkyl substance S and the esters thereof.

It is also an object of this invention to provide for the preparation of such compounds from 6β-16α-dialkylpregnane-3β,5α,17α-triol-20-one and the 5-acetate thereof.

It is further an object of this invention to provide novel intermediates in this process.

Other objects and advantages will be apparent from the following description and the reaction sequence hereinbelow. For purposes of illustration the reaction sequence shows the preparation of the 6,16-dimethyl-substance S and the acetate ester thereof. However, the process is employed for making the corresponding 6,16-dialkyl compounds in which the alkyl groups have from 1 to 8 carbon atoms and the other esters thereof in which the acrylate group has from 1 to 12 carbon atoms.

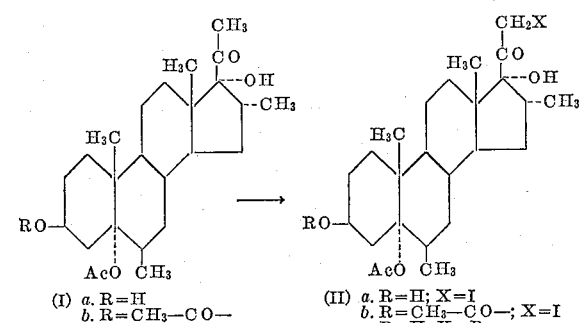

(I) a. R=H
    b. R=CH₃—C O—

(II) a. R=H; X=I
     b. R=CH₃—C O—; X=I
     c. R=H; X=Br
     d. R=CH₃—C O—; X=Br

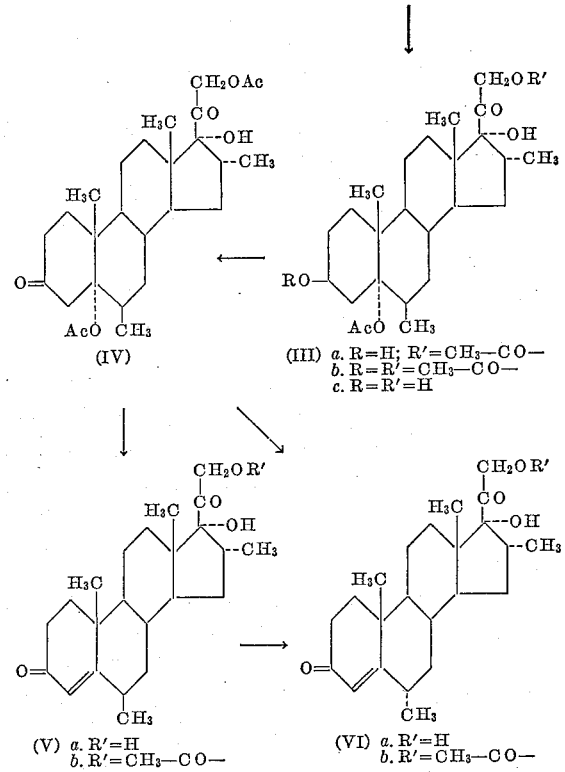

(IV)

(III) a. R=H; R'=CH₃—C O—
      b. R=R'=CH₃—C O—
      c. R=R'=H (V) a. R'=H
    b. R'=CH₃—C O—

(VI) a. R'=H
     b. R'=CH₃—C O—

The starting materials for the present invention are the 6β,16α-dialkylpregnane-3β,5α,17α-triol-20-one 5-acylates and 3,5-diacylates. The 6,16-dimethyl 5-acetate and 3,5-diacetate compounds are specifically shown in the reaction sequence. These materials may be prepared according to our co-pending U.S. application, Serial No. 88,030, filed February 9, 1961. As disclosed therein a 5α,6α-oxido-16-pregnene-3β-ol-20-one 3-acylate is treated with an alkyl Grignard reagent such as methyl magnesium bromide in the presence of cuprous chloride to produce an intermediate dialkylated Grignard complex which, without isolation, is treated with an acetylating agent. There is thus produced a mixture of the cis and trans forms of a 6β,16α-dialkyl-17(20)-pregnene-3β,5α,20-triol, 3,5,20-triacylate. The 17(20)-enol acylate is then epoxidized by treatment with a peracid to give the corresponding 17α,20-oxido-20-acyloxy compound as a mixture of cis and trans isomeric forms. The triacylate mixture is then hydrolyzed under alkaline conditions such as treatment with potassium carbonate in hot aqueous methanol to provide a 6β,16α-dialkylpregnane-3β,5α,17α-triol-20-one 5-monoacylate which is acylated to the corresponding 3,5-diacylate. These later two substances are the starting materials for the present invention.

Briefly, in the present method the dimethyltriolone 5-monoacetate (Ia) or the 3,5-diacetate (Ib) are iodinated with iodine in the presence of calcium oxide and azobisisobutyronitrile to give the corresponding 21-iodo derivative (IIa). The iodine at position 21 is then replaced by treatment with an acetate salt to provide the 21-acetoxy compound (IIIa). This 21-acetoxy compound is then oxidized to 6β,16α-dimethylpregnane-5α,17α,21-triol-3,20-dione 5,21-diacetate (IV). Thermal elimination of the 5-acetoxyl group in IV then produces 6β,16α-dimethyl S acetate (Vb) while mild alkaline treatment affords the 6β,16α- dimethyl S alcohol (Va). Acidic elimination conditions convert IV to 6α,16α-dimethyl S acetate (VIb) while strong alkaline conditions give 6α,16α-dimethyl S alcohol (VIa). The 21-alcohols Va an IVa may be acetylated to produce Vb and VIb, respectively. Conversely, the 6α,16α-dimethyl S acetate (VIb) may be hydrolyzed to 6α,16α-dimethyl S alcohol (VIa).

The foregoing represents the preferred route. As is apparent in the reaction sequence some alternatives are available. These will be discussed in the appropriate places in the detailed description below.

(1) 21-HALOGENATION OF 6β,16α-DIMETHYL-PREGNANE-3β,5α,17α-TRIOL-20-ONE 5-ACETATE (Ia) AND 3,5-DIACETATE (Ib)

Treatment of a tetrahydrofuran-methanol solution of Ia or Ib containing powdered calcium oxide and azobisisobutyronitrile with a tetrahydrofuran-methanol solution of iodine results in direct iodination at carbon 21 to produce the 21-iodo derivative (IIa). The iodination of the 3,5-diacetate (Ib) also results in the loss of the ester function at position 3 so that the same 21-iodo-5-monoacetate (IIa) results from either starting material.

The reaction is normally carried out in a mixture of tetrahydrofuran and methanol using about equal volumes of each solvent. The calcium oxide is normally employed in an amount ranging from about the weight of steroid used to twice the weight of steroid. An amount equal to about one and one-half times the weight of steroid is preferred. The azobisisobutyronitrile is normally employed in an amount equal to about 5% of the weight of steroid. Somewhat smaller amounts or even larger quantities may be used. The time of reaction depends to some extent on the ratio of azobisisobutyronitrile to steroid. The amount of iodine added is normally about equal to the weight of the steroid. In order to initiate the reaction after the addition of a few drops of the iodine solution, exposure to light is preferred, e.g. from a tungsten filament bulb.

The reaction is normally carried out by adding a few drops of the iodine solution, stirring with illumination until absorption of iodine commences and then adding the remainder of the iodine solution over a period of about one-half to one hour. The reaction is allowed to stir at room temperature for an additional short period, then diluted with a solvent such as ether and filtered to remove the calcium oxide and other insoluble materials. The filtrate is washed free of iodine and other water soluble materials, dried and evaporated to afford the 21-iodo product (IIa) as an amorphous solid, readily identified by its characteristic infrared spectra.

The 5-monoacetate (Ia) and the 3-5-diacetate (Ib) may also be brominated, e.g. in methylene chloride, to afford the corresponding 21-bromo derivatives (IIc and IId, respectively). These 21-bromo derivatives may be converted to the corresponding 21acetoxy compounds by treatment with a source of acetate ions in a manner similar to that employed for converting the 21-iodo compound (IIa) to the 21-acetoxy compound (IIIa).

(2) REPLACEMENT OF 21-HALOGEN BY 21-ACYLOXY FUNCTION IN 21-HALO-6β,16α-DIMETHYL-PREGNANE-3β,5α,17α-TRIOL-20-ONE 5-ACETATE (IIa AND IIc) OR 3,5-DIACETATE (IIb AND IId)

The 21-halogen atom in the 21-halo compounds (IIa–d) may be replaced by a 21-acyloxy function. The 21-iodo compound (IIa) on treatment with an acetate salt, for example, undergoes metathetical exchange to produce the corresponding 21-acetoxy compound (IIIa). The 21-bromo compounds (IIc and IId) undergo direct replacement only with difficulty. However, treatment of IIc or IId with a mixture of an iodide salt and an acetate salt allows prior formation of the corresponding 21-iodo compounds (IIa and IIb, respectively) followed by in situ exchange with acetate to afford the 21-acetoxy compounds (IIIa and IIIb, respectively).

The exchange of iodine by acetate is preferably carried out by treatment of IIa in acetone solution with triethylammonium acetate prepared in situ from triethylamine and glacial acetic acid. The triethylamine and acetic acid are employed in a ratio of about 1:1.5, i.e. the acetic acid is in excess. The salt thus produced is normally present in large excess with respect to the steroid compound; somewhat smaller amounts are substantially as effective but larger amounts of acetate salt have no increased beneficial effect. Other acetate salts such as trimethylammonium acetate may also be used, and even alkali metal salts such as sodium or potassium acetate are effective.

The reaction is normally carried out by heating the acetone solution of the mixture for about one hour under reflux. At the end of this time, the reaction is either diluted with about 10 volumes of water or poured into 10 volumes of water. The crude 21-acetoxylated steroid is recovered by extraction with a solvent, for example, ethyl acetate, methylene chloride, and the like followed by drying and evaporation of the solvent extract. The pure material may be separated from the crude mixture by crystallization or by chromatography on, for example, Florisil. Thus, in the above manner, IIa is converted to IIIa.

The 21-bromo compounds (IIc and IId) may be converted to IIIa and IIIb, respectively, by treatment with sodium iodide and potassium acetate in acetone solution containing a small amount of glacial acetic acid. About two moles of sodium iodide and six moles of potassium acetate are normally employed per mole of steroid; the acetic acid is employed in a ratio of about three moles per mole of steroid. The mixture is heated under reflux for about 4 hours, then diluted with an equal volume of water and most of the acetone removed by distillation in vacuo. The crude 21-acetoxy compounds (IIIa and IIIb) are isolated and purified as described above.

Since the desired starting material for the next step in the sequence is the 3β-hydroxy-5α, 21-diacetoxy compound (IIIa), it is normally preferable to start with Ia and proceed via IIa. The route from Ib via IId to IIIb may also be employed, however, since the 3β,5α,21-triacetoxy compound (IIIb) may be converted to the diacetate (IIIa) in the following manner. Hydrolysis of IIIb is carried out by treatment with potassium bicarbonate in aqueous methanol. The reaction is normally conducted at the reflux temperature for about one hour. Other alkaline agents may also be used such as sodium bicarbonate, potassium carbonate or potassium hydroxide. With the stronger bases such as the latter, the time of reflux is somewhat shorter. The solvent medium may also consist of mixtures of water and ethyl alcohol. The 6β,16α-dimethylpregnane-3β,5α,17α,21-tetrol-20-one 5-acetate (IIIc) thus produced is isolated by neutralization with, for example, acetic acid, evaporation in vacuo to a small volume and dilution with water. The crude product is removed by filtration or by extraction with ethyl acetate, methylene chloride or the like, and may be purified by crystallization or chromatography in the usual manner.

The 5-monoacetate (IIIc) is then selectively acetylated at carbon 21 to produce the desired 5,21-diacetataeae (IIIa) by treatment in pyridine solution with exactly one mole of acetic anhydride per mole of steroid. The reaction is normally carried out at room temperature for periods of one to sixteen hours. The product is isolated by careful dilution with water followed by filtration or extraction with ethyl acetate, methylene chloride or the like. The crude product is separated from traces of 5-monoacetate (IIIc) and 3,5,21-triacetate (IIIb) by crystallization or chromatography in the usual manner and is identical to the material prepared directly from IIa.

(3) OXIDATION OF 6β,16α-DIMETHYLPREGNANE-3β,5α,17α,21-TETROL-20-ONE 5α,21-DIACETATE (IIIa)

The oxidation of the 3β-alcohol function of the dimethyltetrolone diacetate (IIIa) to the 3-ketone function is normally carried out in acetone solution by treatment with aqueous chromium trioxide solution. The reaction is very rapid and is normally complete in about two to four minutes. At the end of this time, the excess oxidizing agent is destroyed by adding aqueous sodium bisulfite solution. Other ketone solvents may be used providing they are water-miscible and are not oxidized themselves. The oxidation may also be carried out with chromium trioxide in acetic acid or chromium trioxide in pyridine.

The product is recovered by dilution with saturated salt solution followed by extraction with ethyl acetate, methylene chloride or the like. The solvent extracts are washed free of inorganic materials and acids and then dried. Removal of the solvents in vacuo affords the crude 3-ketone product (IV) which may be purified by recrystallization from, for example, ether-Skellysolve B.

(4) β-ELIMINATION AND EPIMERIZATION OF 6β,16α - DIMETHYLPREGNANE-5α,17α,21-TRIOL-3,20-DIONE 5,21-DIACETATE (IV)

*a. Acid-catalyzed reaction.*—The dimethyltrioldione diacetate (IV) is converted to 6α,16α-dimethyl substance S acetate (VIb) by treatment with a strong acid in an alcoholic solvent. These conditions effect β-elimination of the 5α-acetoxyl group together with one of the hydrogen atoms at carbon 4 to form the double bond between carbon atoms 4 and 5. The α,β-unsaturated ketone thus formed is 6β,16α-dimethyl substance S acetate (V). Under the same reaction conditions and by a process of enolization-ketonization, the hydrogen atom at carbon 6 is labilized. This permits the 6β-methyl group to assume the thermodynamically more stable α-configuration with the hydrogen being in the β-configuration. Thus the reaction conditions effect β-elimination of the 5α-acetoxyl group followed by epimerization of the 6-methyl from the β- to the α-configuration.

Normally the 5α-acetoxy-3-ketone compound (IV) is heated under reflux in ethanol containing a small amount of concentrated aqueous hydrochloric acid for a period of about one to one and one-half hours. Other strong acids may also be used such as p-toluenesulfonic acid, 2,4-dinitrobenzenesulfonic acid, and the like. Other alcoholic solvents may be used such as methanol or isopropanol. The exact times of reflux will depend upon the acid and the boiling point of the solvent used.

The product 6α,16α-dimethyl substance S acetate (6α,16α - dimethyl - 4 - pregnene-17α,21-diol-3,20-dione 21-acetate) (VIb) is isolated by removal of about 70–80% of the alcoholic solvent in vacuo followed by dilution with water. The organic material is removed by extraction with ethyl acetate, methylene chloride or the like. The extracts are washed with water, saturated salt solution, dried and evaporated in vacuo to give the crude VIb which may be purified by recrystallization from, for example, Skellysolve B or by chromatography on alumina or Florisil.

The crude VIb prepared in the above manner is normally partially hydrolyzed at position 21. The isolation of the pure 21-acetate is facilitated by the reacetylation of the crude product with acetic anhydride and pyridine prior to the purification in the normal manner.

*b. Base-catalyzed reaction.*—The dimethyltrioldione diacetate (IV) on treatment with strong alkali in an alcoholic solvent mixture effects the above-described β-elimination and epimerization together with complete hydrolysis of the 21-ester function to give the 6α,16α-dimethyl S alcohol (VIa).

Normally the 5α-acetoxy-3-ketone compound (IV) is heated under reflux in a tetrahydrofuran-methanol solution containing potassium hydroxide. The time of reflux is normally about 15–20 minutes and must be carefully controlled to avoid undesirable side reactions. The mixture is quickly cooled, neutralized, partially concentrated in vacuo and finally diluted with water. The precipitated 6α,16α-dimethyl S alcohol (VIa) is removed by filtration and may be purified by crystallization or chromatography in the usual fashion. The 21-acetate (VIb) may be prepared by acetylation employing acetic anhydride and pyridine.

(5) β-ELIMINATION OF 6β,16α-DIMETHYLPREGNANE-5α,17α,21-TRIOL-3,20-DIONE 5,21-DIACETATE (IV)

*a. Thermal elimination.*—The 6β,16α-dimethyl substance S acetate (Vb) intermediate above may be prepared by thermal elimination of the 5α-acetoxyl group. This elimination is conducted by heating the dimethyltrioldione diacetate in vacuo at about 145–150° C. for a period of about eighteen hours. The product is substantially pure but may be recrystallized from the usual solvents or solvent mixtures. By the above procedure, the 5α-acetoxyl group is eliminated to form the Δ⁴-3-ketone grouping without the concomitant epimerization of the 6β-methyl group.

*b. Base-catalyzed reaction.*—The β-elimination of the 5α-acetoxyl group may also be carried out by treatment with a weak alkali. Under these conditions the 6β-methyl is not epimerized but the 21-ester function is removed to afford 6β,16α-dimethyl S alcohol (Va).

Normally, the 5α-acetoxy-3-ketone compound (IV) is heated under reflux in a tetrahydrofuran-methanol-water mixture containing potassium bicarbonate. The time of reflux must be carefully controlled and is normally fifteen minutes. The mixture is quickly cooled, neutralized and diluted with water to precipitate the 6β,16α-dimethyl S alcohol (Va) which may be removed by filtration. The 21-acetate (Vb) may be prepared in the usual manner by acetylation with acetic anhydride and pyridine at room temperature.

Finally, treatment of the 6β,16α-dimethyl S compounds (Va and Vb) under the conditions described in section 4a or 4b effects epimerization of the 6β-methyl group to the more stable 6α-methyl to give the 6α,16α-dimethyl S compounds (VIa and VIb).

While the foregoing discussion makes reference to the dimethyl compounds and the acetate esters thereof, it is understood that such was done for purposes of simplicity in illustration and the invention is not to be construed as limited thereto as other alkyl groups having from 1 to 8 carbon atoms may be employed as well as other acylates having from 1 to 12 carbon atoms.

The novel intermediates in the process may thus be illustrated by means of the following structural formulae (A)

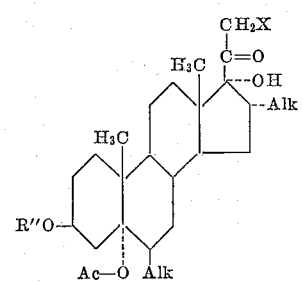

where Alk is an alkyl group having from 1 to 8 carbon atoms, Ac is an acyl group having from 1 to 12 carbon atoms, R″ is selected from the group consisting of hydrogen and acyl groups having from 1 to 12 carbon atoms and X is selected from the group consisting of iodine and bromine.

(B)

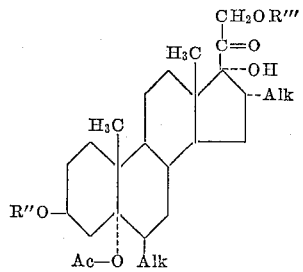

where R″, Alk and Ac are as defined above and R‴ is selected from the group consisting of hydrogen and acyl groups having from 1 to 12 carbon atoms.

(C)

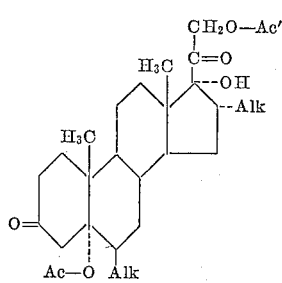

where Ac′ is an Acyl group having from 1 to 12 carbon atoms and Alk and Ac are as defined above.

The invention can further be illustrated by means of the following examples:

Example 1

21-HALOGENATION OF 6β,16α-DIMETHYLPREGNANE-3β,5α,17α-TRIOL-20-ONE 5-ACETATE (Ia)

To a solution of 3.0 g. of 6β,16α-dimethylpregnane-3β,5α,17α-triol-20-one 5-acetate in 15 ml. of tetrahydrofuran and 15 ml. of methanol was added 4.5 g. of calcium oxide and 150 mg. of azobisisobutyronitrile. The stirred mixture was illuminated with a 60 watt tungsten bulb and then a few drops of a solution of 3.0 g. of iodine in 15 ml. of tetrahydrofuran and 9 ml. of methanol was added. After 25 minutes uptake of iodine began and the remainder of the iodine solution was added in one hour. The mixture was stirred for an additional hour, then diluted with ether and filtered. The filtrate was washed once with 15% aqueous sodium iodide solution and then with saturated salt solution, dried and evaporated in vacuo below 30° to an oil. This oil consisted of substantially pure 21-iodo-6β,16α-dimethylpregnane-3β,5α,17α-triol-20-one 5-acetate (IIa), $$\lambda_{max.}^{CCl_4} \ 5.75, \ 5.80 \ \text{and} \ 8.10\mu$$

Example 2

21-HALOGENATION OF 6β,16α-DIMETHYLPREGNANE-3β,5α,17α-TRIOL-20-ONE 3,5-DIACETATE (Ib)

To a solution of 0.464 g. of 6β,16α-dimethylpregnane-3β,5α,17α-triol-20-one 3,5-diacetate in 3.4 ml. of tetrahydrofuran and 2.7 ml. of methanol was added 1.03 g. of calcium oxide and 30 mg. of azobisisobutyronitrile. The stirred mixture was illuminated with a 60 watt tungsten bulb and then a few drops of a solution of 0.525 g. of iodine in 2.7 ml. of tetrahydrofuran and 1.7 ml. of methanol was added. After 17 minutes, uptake of iodine began and the remainder of the iodine solution was added dropwise in 23 minutes additional. The mixture was stirred for an additional 45 minutes, filtered and the filtrate treated with 20 ml. of 5% aqueous sodium thiosulfate solution. The mixture was extracted several times with ethyl acetate. The combined extracts were washed several times with saturated salt solution, dried and evaporated to dryness in vacuo at room temperature to give an amorphous solid, 0.527 g., $$\lambda_{max.}^{CCl_4} \ 2.79, \ 2.86, \ 5.75, \ 5.80, \ 8.10\mu$$

The infrared spectrum of this product was identical to that of the product (IIa) in Example 1 above.

Example 3

REPLACEMENT OF 21-IODINE BY 21-ACETOXYL IN 21-IODO - 6β,16α - DIMETHYLPREGNANE-3β,5α,17α-TRIOL-20-ONE 5-ACETATE (IIa)

The crude 21-iodo compound obtained in Example 1 above was dissolved in 40 ml. of acetone and added to a mixture of 20.6 ml. of triethylamine and 14 ml. of glacial acetic acid. The mixture was heated under reflux for 55 min., then poured into 500 ml. of water. The oil which separated was extracted with ethyl acetate, and the extracts washed twice with water and dried. Evaporation of the solvent in vacuo gave 3.4 g. of semisolid residue which was dissolved in benzene and placed on a Florisil column.

The material obtained by elution with benzene-ether mixtures was combined and recrystallized to give 1.72 g. of 6β,16α - dimethylpregnane-3β,5α,17α,21-tetrol-20-one 5,21-diacetate melting at about 133–151°. Recrystallization from an ether-Skellysolve B mixture raised the melting point to 159–161°, [α]$_D^{23}$+8.6° (Chlf.).

*Analysis.*—Calcd. for $C_{27}H_{42}O_7$: C, 67.75; H, 8.85. Found: C, 67.61; H, 9.10.

A 0.474 g. sample of the crude 21-iodo compound obtained in Example 2 above was dissolved in 5.6 ml. of acetone and 1.96 ml. of acetic acid and 2.88 ml. of triethylamine added. The resulting yellow solution was heated under reflux for 65 minutes and then poured into 100 ml. of water. The oil which separated was extracted with ethyl acetate. The combined extracts were washed with 5% aqueous sodium bicarbonate solution and with saturated aqueous salt solution, dried and evaporated in vacuo to an amorphous residue, 0.382 g. Two crystallizations from ether-petroleum ether (B.P. 60–68°) gave colorless crystals, M.P. 161–163°, $$\lambda_{max.}^{KBr} \ 5.73 \ (\text{sh.}), \ 5.80, \ 5.87 \ (\text{sh.}), \ 7.88, \ 8.08, \ 9.52\mu$$

The infrared spectrum was identical to the product (IIIa) prepared above and the melting point was not depressed on admixture.

Example 4

OXIDATION OF 6β,16α-DIMETHYLPREGNANE-3β,5α,17α, 21-TETROL-20-ONE 5α,21-DIACETATE (IIIa)

To a well stirred solution of 1.72 g. of 6β,16α-dimethylpregnane-3β,5α,17α,21-tetrol-20-one 5,21-diacetate in 100 ml. of acetone was added in 75 sec. 2 ml. of a ca. 8 N aqueous chromic acid solution prepared as follows: 2.67 g. of chromium trioxide dissolved in a mixture of 9 ml. of water and 2 ml. of concentrated sulfuric acid. The mixture was allowed to stir for an additional 105 sec. and then a solution of 3 g. of sodium bisulfite in 10 ml. of water was quickly added. The mixture was diluted with saturated salt solution and the oil which separated was extracted with ethyl acetate. The extracts were washed once with water, once with saturated salt solution and dried. Evaporation of the solvent in vacuo produced a foam which crystallized on addition of ether. Filtration gave 1.60 g. of 6β,16α-dimethylpregnane-5α,17α,21-triol-3,20-dione 5,21-diacetate, melting at about 75–80°. Recrystallization from an ether-Skellysolve B mixture afforded crystalline material which changed form at about 90–96°, and which then melted at 112–121°, [α]$_D^{27}$ +9.5° (Chlf.).

*Analysis.*—Calcd. for $C_{27}H_{40}O_7$: C, 68.04; H, 8.46. Found: C, 68.13, 68.21; H, 8.66, 8.36.

Example 5

β-ELIMINATION AND EPIMERIZATION OF 6β,16α-DIMETHYLPREGNANE-5α,17α,21-TRIOL-3,20-DIONE 5,21-DIACETATE (IV)

To a solution of 1.1 g. of 6β,16α-dimethylpregnane-5α,17α,21-triol-3,20-dione, 5,21-diacetate in 100 ml. of absolute ethanol was added 0.5 ml. of concentrated hydrochloric acid. The mixture was heated under reflux for 70 minutes, then cooled and most of the solvent evaporated in vacuo. Water was added and the oil which separated was extracted with ethyl acetate. The extracts were washed with saturated salt solution, dried and evaporated in vacuo to a foam. The foam was dissolved in 5 ml. of pyridine and treated for 16 hours with 1.0 ml. of acetic anhydride. The reaction mixture was diluted with water and extracted with ethyl acetate. The extracts were washed with dilute hydrochloric acid, water, saturated salt solution and dried. Evaporation of the solvent in vacuo gave a foam which was dissolved in benzene and chromatographed on alumina. The material obtained by elution with benzene-ether and ether-acetone mixtures was crystallized from Skellysolve B to give 6α,16α-dimethyl-4-pregnene-17α,21-diol-3,20-dione 21-acetate (6α,16α-dimethyl-Reichstein's substance C acetate) melting at about 171–175°. Recrystallization raised the melting point to 172–175°, $[\alpha]_D^{28}$ +95.3° (Chlf.). Lit., M.P. 174–176°, $[\alpha]_D$ +100° (Chlf.).

*Analysis.*—Calcd. for $C_{25}H_{36}O_5$: C, 72.08; H, 8.71. Found: C, 72.12; H, 8.63.

Example 6

THERMAL β-ELIMINATION OF 6β,16α-DIMETHYLPREGNANE-5α,17α,21-TRIOL-3,20-DIONE 5,21-DIACETATE (IV)

Eighty-five mg. of 6β,16α-dimethylpregnane-5α,17α,21-triol-3,20-dione 5,21-diacetate was heated for about 18 hours at 147° (bath temperature) and 0.1 mm. Hg. The resulting 6β,16α-dimethyl-4-pregnene-17α,21-diol-3,20-dione 21-acetate melted at about 214–221°, $[\alpha]_D^{24}$ +68.6° (Chlf.), $\lambda_{max}^{KBr}$ 5.72, 5.82, 6.10, 6.28, 8.14 and 11.50μ.

Example 7

β-ELIMINATION AND HYDROLYSIS OF 6β,16α-DIMETHYLPREGNANE-5α,17α,21-TRIOL-3,20-DIONE 5,21-DIACETATE (IV) WITH POTASSIUM BICARBONATE

A solution of 477 mg. of the dimethyltrioldione diacetate (IV) in 15.0 ml. of tetrahydrofuran and 75.0 ml. of methanol was treated with 30.0 ml. of 1 M aqueous potassium bicarbonate solution under a nitrogen atmosphere. A colorless solid separated which redissolved when the solution was heated to reflux. Reflux was continued for 15 minutes and then the mixture cooled rapidly to room temperature under nitrogen and finally neutralized with glacial acetic acid. The solution was evaporated in vacuo at ca. 50° to about 25 ml. and then 50 ml. of water was added which caused the precipitation of a crystalline solid. The solid was removed by filtration and washed thoroughly with water. After drying, the product weighed 294 mg., M.P. 200–205°, $\lambda_{max}^{KBr}$ 5.88, 6.05, 6.23μ

Three crystallizations from acetone-petroleum ether (B.P. 60–68°) gave the pure 6β,16α-dimethyl S (Va), M.P. 217–223°, $[\alpha]_D$ +50.9° (Chlf.).

A sample of the material above was acetylated with acetic anhydride and pyridine at room temperature overnight. Workup in the usual manner gave the 21-acetate (Vb), M.P. 220–228°, $[\alpha]_D$ +69.1° (chloroform), infrared spectrum identical to the material prepared above by thermal elimination.

Example 8

β-ELIMINATION, EPIMERIZATION AND HYDROLYSIS OF 6β,16α-DIMETHYLPREGNANE-5α,17α,21-TRIOL-3,20-DIONE 5,21-DIACETATE (IV) WITH POTASSIUM HYDROXIDE

A solution of 0.953 g. of the dimethyltrioldione diacetate (IV) in 150 ml. of tetrahydrofuran and 30 ml. of methanol was placed under a nitrogen atmosphere. The solution was heated to reflux, 10 ml. of 5% methanolic potassium hydroxide added quickly, and reflux maintained for 17 minutes. The mixture was quickly cooled to room temperature, neutralized with glacial acetic acid and concentrated in vacuo to a small volume. Addition of water caused the separation of a crystalline solid which was removed by filtration, washed thoroughly with water and dried, wt. 0.604 g., M.P. 182–195°. The product was shown by paper strip chromatography to be a mixture of the 6α- and 6β-epimeric 21-alcohols (Va and VIa). Acetylation in the usual manner of a portion of the material prepared above gave a mixture of the 6α- and 6β-epimeric 21-acetates (Vb and VIb) as shown by paper chromatrographic comparisons. The epimeric acetates were separated by column chromatography on silica gel.

It is to be understood that the invention is not to be limited to the exact details of operation or the exact compounds shown and described, as obvious modifications and equivalents will be apparent to those skilled in the art and the invention is to be limited only by the scope of the appended claims.

The embodiments of the invention in which an exclusive property or privilege is claimed are defined as follows:

1. A 6,16-dialkyl steroid compound having the formula

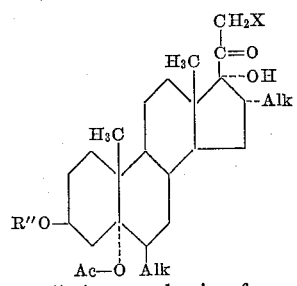

where Alk is an alkyl group having from 1 to 8 carbon atoms, X is selected from the group consisting of iodine and bromide atoms, Ac is an acyl group of a hydrocarbon carboxylic acid having from 1 to 12 carbon atoms and R″ is selected from the group consisting of hydrogen and acyl groups having from 1 to 12 carbon atoms.

2. A 6,16-dialkyl steroid compound as defined in claim 1 in which Alk is methyl.

3. A 6,16-dialkyl steroid compound as defined in claim 1 in which R″ is hydrogen.

4. 21-iodo-6β,16α-dimethylpregnane-3β,5α,17α-triol-20-one 5-acetate.

5. 21-iodo-6β,16α-dimethylpregnane-3β,5α,17α-triol-20-one 3,5-diacetate.

6. 21-bromo-6β,16α-dimethylpregnane-3β,5α,17α-triol-20-one 3,5-diacetate.

7. A 6,16-dialkyl steroid compound having the formula

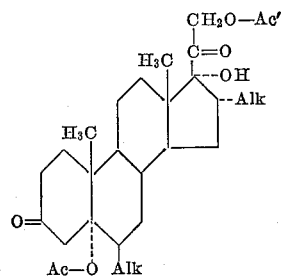

in which Alk is an alkyl group having from 1 to 8 carbon atoms and Ac and Ac' are acyl groups of hydrocarbon carboxylic acids having from 1 to 12 carbon atoms.

8. A 6,16-dialkyl steroid as defined in claim 7 in which Alk is methyl.

9. 6β,16α - dimethylpregnane-5α17α,21-triol-3,20-dione 5,21-diacetate.

10. A 6,16-dialkyl steroid compound having the formula

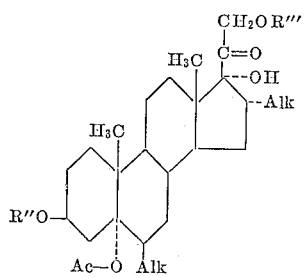

where Alk is an alkyl group having from 1 to 8 carbon atoms, Ac is an acyl group of a hydrocarbon carboxylic acid having from 1 to 12 carbon atoms, R'' is selected from the group consisting of hydrogen and acyl groups of hydrocarbon carboxylic acids having from 1 to 12 carbon atoms and R''' is selected from the group consisting of hydrogen and acyl groups of hydrocarbon carboxylic acids having from 1 to 12 carbon atoms.

11. A 6,16-dialkyl steroid compound as defined in claim 10 in which Alk is methyl.

12. A 6,16-dialkyl steroid compound as defined in claim 10 in which R''' is hydrogen.

13. 6β,16α - dimethylpregnane - 3β,5α,17α,21-tetrol-20-one 5,21-diacetate.

14. In a process of preparing 6,16-dimethyl substance S and the esters thereof the sequence of steps comprising (a) treating 6β,16α-dimethylpregnane-3β,5α,17α-triol-20-one 5-acetate with a solution of iodine to form the 21-iodo compound, (b) treating the 21-iodo compound with an acylate salt of a hydrocarbon carboxylic acid having from 1 to 12 carbon atoms to form the 21-acylate, (c) treating the product of (b) with chromium trioxide to convert the 3-alcohol function to a 3-ketone function, and (d) heating the product of (c) to eliminate the 5α-acetoxyl group.

15. In a process of preparing 6,16-dimethyl substance S, the step of treating 6β,16α-dimethylpregnane-3β,5α,17α-triol-20-one 5-acetate with a solution of iodine thereby forming the 21-iodo derivative.

16. In a process of preparing 6,16-dimethyl substance S the step of treating 21-iodo-6β,16α-dimethylpregnane-3β,5α,17α-triol-20-one 5-acetate with an acylate salt of a hydrocarbon carboxylic acid having from 1 to 12 carbon atoms thereby converting the 21-iodo derivative to the 21-acylate.

17. In a process as defined in claim 16 wherein said acylate salt is trimethylammonium acetate.

18. In a process of preparing 6,16-dimethyl substance S the step of treating 6β,16α-dimethylpregnane-3β,5α,17α,21-tetrol-20-one 5α,21-diacetate with chromium trioxide thereby forming 6β,16α-dimethylpregnane-5α,17α,21-triol-3,20-dione 5,21-diacetate.

19. In a process of preparing 6,16-dimethyl substance S the step of heating under reflux 6β,16α-dimethylpregnane-5α17α,21 triol-3,20-dione 5.21-diacetate in an alcoholic solution of hydrochloric acid thereby effecting elimination of the 5α-acetoxyl group and epimerization of the 6β-methyl group.

20. In a process of preparing 6,16-dimethyl substance S the step of heating 6β,16α-dimethylpregnane-5α,17α,21-triol-3,20-dione 5,21-diacetate at about 145–150° C. thereby effecting elimination of the 5α-acetoxyl group.

References Cited in the file of this patent
UNITED STATES PATENTS 2,929,815    Sletzinger _____ Mar. 22, 1960
3,030,360    Lincoln et al. _____ Apr. 17, 1962

UNITED STATES PATENT OFFICE

CERTIFICATE OF CORRECTION

Patent No. 3,123,624          March 3, 1964

Robert P. Graber et al.

It is hereby certified that error appears in the above numbered patent requiring correction and that the said Letters Patent should read as corrected below.

Column 1, line 47, for "acrylate" read -- acylate --; column 2, line 55, for "later" read -- latter --; column 9, line 25, for "C" read -- S --; column 10, line 48, for "bromide" read -- bromine --.

Signed and sealed this 28th day of July 1964.

(SEAL)

Attest:

ESTON G. JOHNSON          EDWARD J. BRENNER
Attesting Officer           Commissioner of Patents